United States Patent [19]

Nonaka et al.

[11] Patent Number: 4,559,868
[45] Date of Patent: Dec. 24, 1985

[54] INSTRUMENT PANEL DEVICE FOR VEHICLES

[75] Inventors: Toshihiko Nonaka; Tetsuo Toda, both of Saitama, Japan

[73] Assignee: Honda Giken Kogyo Kabushiki Kaisha, Tokyo, Japan

[21] Appl. No.: 585,098

[22] Filed: Mar. 1, 1984

[30] Foreign Application Priority Data

| Mar. 1, 1983 | [JP] | Japan | 58-33250 |
| Mar. 1, 1983 | [JP] | Japan | 58-33251 |
| Mar. 1, 1983 | [JP] | Japan | 58-29603[U] |

[51] Int. Cl.⁴ .............................................. B60H 1/00
[52] U.S. Cl. .................................... 98/2.08; 180/90
[58] Field of Search ............... 98/2, 2.05, 2.08, 2.11, 98/41 R; 180/90

[56] References Cited

U.S. PATENT DOCUMENTS 3,264,971  8/1966  Dangauthier .............................. 98/2
4,223,754  9/1980  Mizuho et al. ...................... 98/2.08 X

FOREIGN PATENT DOCUMENTS 2383800 10/1978  France ................................. 98/2.08
55175512  6/1954  Japan .
881228 11/1961  United Kingdom ............... 98/41 R Primary Examiner—Harold Joyce
Attorney, Agent, or Firm—Armstrong, Nikaido, Marmelstein & Kubovcik

[57] ABSTRACT

An instrument panel device for vehicles. The instrument panel device includes a base panel stretched substantially over the entire width of the passenger room and face, back, and top panels attached to the base panel to define therewith an air control duct space, a wide flow duct space, and a defroster duct space, respectively. The base panel has a lower partition wall portion separating the air control duct space and the wide flow duct space from each other and an upper partition wall portion separating the wide flow duct space and the defroster duct space from each other.

2 Claims, 4 Drawing Figures

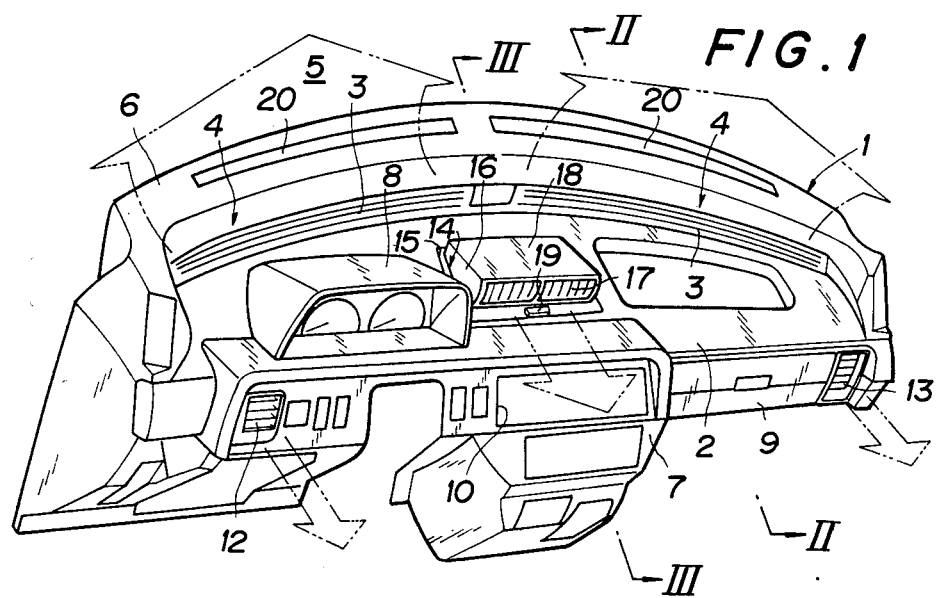

INSTRUMENT PANEL DEVICE FOR VEHICLES

BACKGROUND OF THE INVENTION

The present invention relates to an instrument panel device for vehicles. More particularly, the invention relates to an instrument panel device for a vehicle equipped with an air conditioner.

There have been proposed various instrument panel devices for vehicles, such as in Japanese Utility Model Laid-Open Publication No. 55-175512, in which controlled air from an air conditioner is distributed by air ducts and introduced into a passenger compartment from three different air outlets provided on an instrument panel assembly, i.e., a defroster outlet for a front windshield, a wide air outlet extending substantially over the entire width of the panel assembly, and a small spot outlet directed toward a passenger, the wide and small outlets being alternately selectable for the supply of controlled air.

In such conventional instrument panel device, however, the air ducts distributing the air from the air conditioner to the air outlets are separately fabricated with respect to the instrument panel assembly, thus failing to make an effective use of the inner space of the panel assembly, letting alone the rigidity to be relatively low.

Moreover, in such conventional instrument panel devices, the alternative selection between the wide and small air outlets is effected with a customary manual changeover mechanism unactuatable by a simple one-touch operation and unable to show at a glance which outlet is put in service.

Further, in such conventional instrument panel devices, the changeover mechanism for the alternative selection between the wide and small air outlets is composed of a plate-like deflector having relatively high air resistance, when operated, thus lacking the smoothness of operation.

OBJECTS AND SUMMARY OF THE INVENTION

The present invention has been achieved to effectively overcome such shortcomings in conventional instrument panel devices for vehicles of the abovedescribed type.

Accordingly, an object of the present invention is to provide an instrument panel device for vehicles, which has an improved rigidity and successfully achieves an effective use of inner space, while the assembly process thereof is favorably simplified.

Another object of the present invention is to provide an instrument panel device for vehicles, in which an alternative selection between wide and small air outlets is effectable by a one-touch operation and can be grasped at a glance.

Still another object of the present invention is to provide an instrument panel device for vehicles, in which a changeover mechanism between wide and small air outlets is smoothly operable.

According to the present invention, there is provided an instrument panel device for a vehicle having a passenger compartment, a front wind shield fitted at the front end of the passenger room, a passenger's seat placed in the passenger room, and an air conditioner for conditioning the air of the passenger room, comprising a base panel member having high rigidity, the base panel member being dimensioned to have substantially the same width as the passenger room, a set of panel plates attached to the base panel member for defining therewith a defroster duct space, a wide flow duct space, and an air control duct space all adapted for the distribution of controlled air from the air conditioner, the defroster, wide flow, and air control duct spaces communicating with the passenger compartment through a defroster outlet directed toward the front windshield, a wide air outlet extending substantially over the entire width of the base panel member, and a plurality of spot air outlets directed toward the passenger's seat, respectively, the wide air outlet being formed in the base panel member and the defroster outlet and the plurality of spot air outlets being formed in the panel plates, a changeover mechanism for alternately selecting the distribution of the controlled air between the wide flow duct space and the air control duct space, a first partition wall separating the defroster duct space and the wide flow duct space from each other, and a second partition wall separating the wide flow duct space and the air control duct space from each other, the first and second partition walls forming integral parts of the base panel member.

BRIEF DESCRIPTION OF THE DRAWINGS

The above and further features, objects and advantages of the present invention will more fully appear from the following detailed description of the preferred embodiment of the invention when the same is read in conjunction with the accompanying drawings, in which:

FIG. 1 is a perspective view of an instrument panel device according to a preferred embodiment of the present invention;

FIG. 2 is a longitudinal sectional view taken along line "II"—"II" of FIG. 1;

FIG. 4 is a view of a rotary damper seen along arrow "IV" of FIG. 3.

DETAILED DESCRIPTION OF A PREFERRED EMBODIMENT

Figure 3:
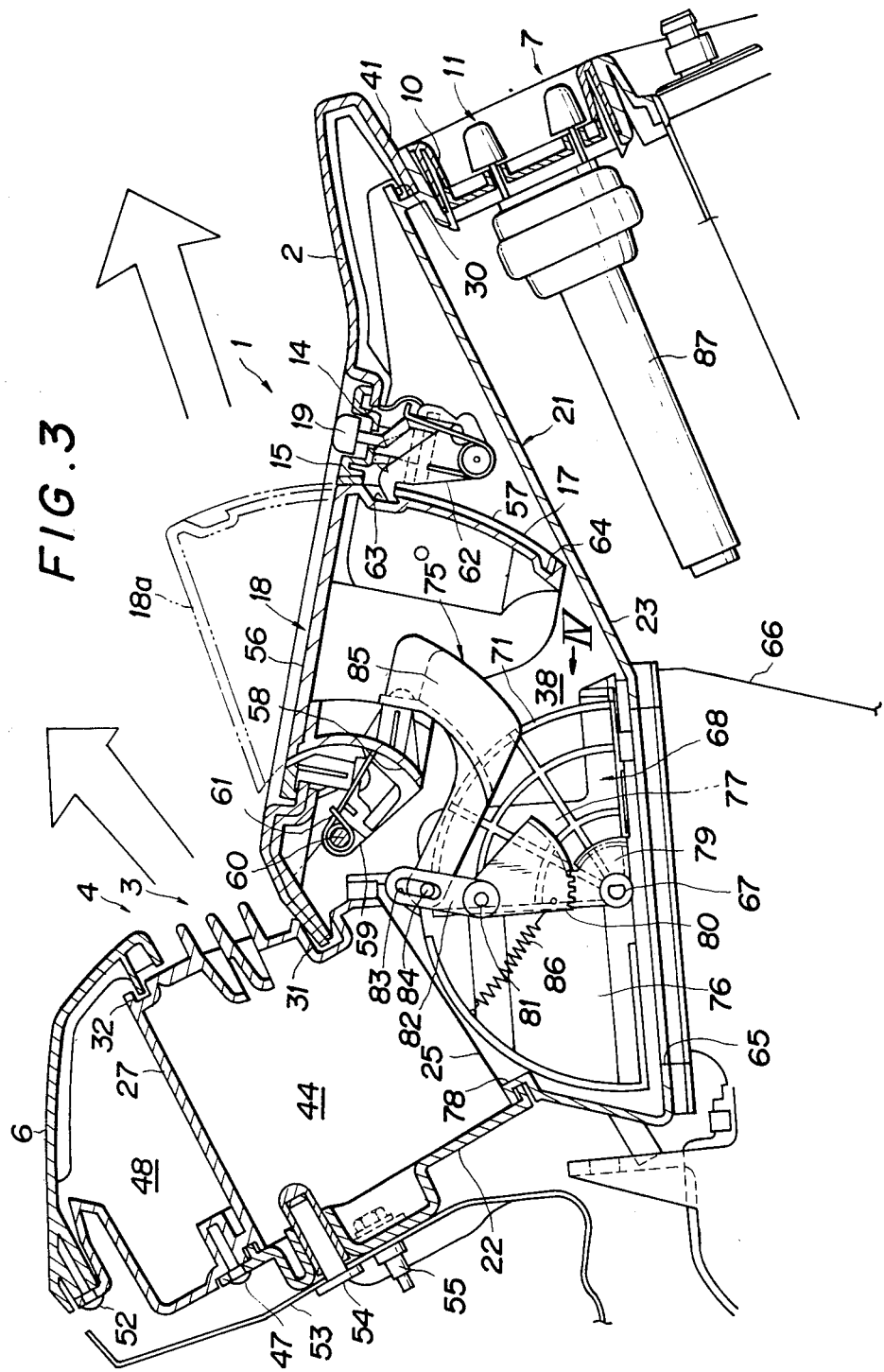
FIG. 3 is an enlarged longitudinal sectional view taken along line "III"—"III" of FIG. 1.

Referring first to FIG. 1, generally designated at reference numeral 1 is an instrument panel assembly arranged at the front end of a passenger compartment of an automotive vehicle. The instrument panel assembly 1 has exposed inside of the passenger compartment a face panel 2 gently sloping downwardly and jutting out rearwardly, an inclined wall portion 4 rising while slanting frontwardly from the upper edge of the face panel 2, the inclined wall portion 4 being formed with a wide air outlet or distribution grille 3 extending in the transverse direction of the vehicle substantially over the entire width of the panel assembly 1, a top panel 6 ascending while tracing a frontwardly curved line from the front edge of the inclined wall portion 4 and slanting frontwardly toward a front windshield 5, and a down wall portion 7 extending downwardly from the lower edge of the face panel 2. Moreover, the panel assembly 1 has fitted in the left part of the face panel 2, near the front edge thereof, a meter unit 8 with various meters such as a speedometer built therein, at the right of the down wall portion 7 a glove compartment 9, and in a central recess or opening 10 formed in the down wall portion 7 an air-conditioning console 11 provided with a fan switch, a temperature control lever, and the like. Further, the assembly 1 has formed therein at the left and right of the down wall portion 7 either of a pair of spot air outlets 12, 13 adapted to locally distribute the controlled air from an air conditioner (not shown) into the passenger compartment, and in the longitudinally and transversely central part of the face panel 2 a rectangular opening 14, in which is accommodatably arranged a hopout outlet 18 with a small air distribution grille 17 formed in a rounded rear face thereof, the hopout outlet 18 slidably abutting at both left and right side wall portions 16 thereof on a frame member 15 fitted in the opening 14. The frame member 15 has in the rear part thereof a pushbutton 19 adapted to manually release the outlet 18 into a hopping action. Furthermore, in the top panel 6, there are symmetrically formed a pair of air slits 20, 20 extending in the transverse direction of the panel assembly 1. Incidentally, the width of the panel assembly 1 is substantially equal to that of the passenger compartment.

Referring now to FIG. 2, the instrument panel assembly 1 further includes a base panel 21 shaped substantially in the form of a letter W in the longitudinal cross section and provided with a frontwardly slanting back panel 22 fitted on the back thereof in addition to the face panel 2 and the upper panel 6 fitted on the rear and upper parts thereof, respectively. The base panel 21 is continuously and integrally constituted with, besides the down wall portion 7, a bottom wall portion 23 descending frontwardly from the upper edge of the down wall portion 7 and extending frontwardly of the vehicle, a lower back wall portion 24 rising while slanting frontwardly from the front edge of the bottom wall portion 23, a lower partition wall portion 25 bent at the lower end thereof substantially at a right angle toward the inclined wall portion 4 so as to slope upwardly from the upper edge of the back wall portion 24, a central face wall portion 26 bent at the lower end thereof upwardly so as to ascend slightly frontwardly from the upper edge of the partition wall portion 25, the face wall portion 26 including the inclined wall portion 4, an upper partition wall portion 27 bent at the rear end thereof frontwardly so as to descend from the upper edge of the face wall portion 26 substantially in parallel with the lower partition wall portion 25, an upper back wall portion 28 bent at the lower end thereof upwardly substantially at a right angle so as to ascend frontwardly from the front edge of the partition wall portion 28, and a top wall portion 28 bent at the front end thereof substantially at a right angle toward the top panel 6 so as to ascend rearwardly from the upper edge of the back wall portion 28 substantially in parallel with the partition wall portion 27. The lower partition wall portion 25 as well as the upper partition wall portion 27 are stretched transversely substantially over the entire width of the panel assembly 1. The lower back wall portion 24 and the upper back wall portion 28 are positioned to be coplaner relative to each other. The top wall portion 29 is dimensioned so as to hang the rear edge thereof substantially above the longitudinally central part of the upper partition wall portion 27.

The bottom wall portion 23, the lower partition wall portion 25, the upper partition wall portion 27, and the top wall portion 29 have at the rear edges thereof rear fitting recesses 30 (FIG. 3), 31, 32, and 33 formed therein, respectively, so as to open rearwardly, while the lower and upper partition wall portions 25, 27 have at the front edges thereof also front fitting recesses 34, 35 formed therein, respectively, so as to open frontwardly.

The face wall portion 26 is formed substantially over the entire width thereof with a plurality (pair in this embodiment) of vertically repeated combinations of a fin 36 and a slit 37, thereby constituting the wide air distribution grille 3.

The face panel 2 is stretched from the rear edge of the bottom wall portion 23 on the rear edge of the lower partition wall portion 25, thus defining together with the wall portions 23 to 25 of the base panel 21 a lower air distribution duct or air control duct 38 extending transversely of the instrument panel assembly 1. The face panel 2 comprises an inner panel member 39 made of a rigid material and an outer pad member 40 put thereon for the absorption of shocks, the members 39, 40 having their rear fixing portions 41 (FIG. 3) and front fixing portion 42 fitted in the rear fitting recess 30 of the bottom wall portion 23 and in the rear fitting recess 31 of the lower partition wall portion 25, respectively, and being secured at the intermediate part thereof to the bottom wall portion 23 by suitable fixing means or with a plurality of screws 43 in this embodiment.

On the other hand, the back panel 22 is stretched between the respective front edges of the lower partition wall portion 25 and the upper partition wall portion 27, thus defining together with the wall portions 25 to 27 of the base panel 21 a central air distribution duct or wide flow duct 44 extending transversely of the instrument panel assembly 1. The back panel 22, which is made of a rigid material and adapted partly to raise the rigidity of the panel assembly 1 in all the vertical, longitudinal, and transverse directions thereof, has a lower fixing portion 45 and an upper fixing portion 46 fitted in the front fixing recesses 34, 35 of the lower and upper partition wall portions 25, 27, respectively, while being secured to the base panel 21 by suitable fixing means or with a plurality of screws 47 (FIG. 3) in this embodiment.

Further, the top panel 6 is stretched between the respective rear edges of the upper partition wall portion 27 and the top wall portion 29, thus defining together with the wall portions 27 to 29 of the base panel 21 an upper air distribution duct or defroster duct 48 extending transversely of the panel assembly 1. The top panel 6, which is made of a rigid material relatively high in hardness, has an upper fixing portion 49 and a lower fixing portion 50 fitted in the rear fitting recess 33 of the top wall portion 29 and the rear fitting recess 32 of the upper partition wall portion 27, respectively, while being secured to the base panel 21 by suitable fixing means or with a plurality of screws 51, 52 (FIG. 3) in this embodiment.

Referring now to FIG. 3, the back panel 22 is further secured by a plurality of bolts 54, 55 to a rigid member 53 of a body of the vehicle.

The hopout outlet 18 is composed of, besides the left and right side wall portions 16, a flat upper wall portion 56, a round rear wall portion 57 as the rear face formed therethrough with the small air distribution grille 17, a round front wall portion 58, and a support portion 59 projecting frontwardly from the lower end of the front wall portion 58, and the interior of the outlet 18 is opened to the air control duct 38. The support portion 59 is pivoted at the front end thereof on a transversely extending support shaft 60 fitted at both ends thereof in the front part of the frame member 15, and the rear wall portion 57 and the front wall portion 58 are both configured arcuate about the support shaft 60. The support shaft 60 has a spring 61 coiled thereon and adapted to resiliently bias the front wall portion 58 upwardly, thereby urging counterclockwise the angular position of the hopout outlet 18 about the shaft 60, while the rear wall portion 58 has formed on the outside thereof an upper check recess 63 and a lower check recess 64 engageable, when moved down and moved up, respectively, with a claw 62 which is interlocked with a pushbutton 19 provided in the rear part of the frame member 15. When the upper wall portion 56 of the hopout outlet 18 is manually pressed down, the upper check recess 63 is brought into engagement with the claw 62, thereby keeping the upper face of the upper wall portion 56 substantially flush with that of the frame member 15, thus holding the distribution grille 17 in the air control duct 38 of the instrument panel assembly 1. To the contrary, when the pushbutton 19 is manually pushed down, the upper check recess 63 becomes released from the engagement with the claw 62, thus moving upwardly with the resilient force of the spring 61, causing the grille 17 to come up above the face panel 2 into a position 18a oriented to a passenger as shown in FIG. 3 by imaginary line, in which position 18a the lower check recess 64 is caught by the claw 62.

As shown in FIG. 3, the bottom wall portion 23 of the base panel 21 has in the transversely central part thereof an air supply port 65 formed therethrough, the supply port 65 communicating at the lower side thereof with an air supply duct 66 connected to the beforementioned air conditioner.

Above the supply port 65, there is provided a rotary deflector or damper 68 disposed under the hopout outlet 18 and arranged to be rotatable by 90° about a transversely extending support shaft 67 which is supported at both ends thereof on the circumferential part of the supply port 65.

As seen from FIGS. 3 and 4, the rotary damper 68 consists of left and right fan-like side wall portions 69, 70, an arcuate peripheral wall portion 71 stretched between the respective outer edges of the side wall portions 69, 70, and left and right side plates 72, 73, thereby constituting a two-way changeover system having front and rear changeover chambers 76, 77.

As shown in FIG. 4, at the outside of the left side wall portion 69 of the rotary damper 68, there is provided a link space 74 having disposed therein a later-described linkage 75 adapted to interlink the rotary motion of the damper 68 with the pivotal motion of the hopout outlet 18.

Referring again to FIG. 3, the lower partition wall portion 25 of the base panel 21, which portion 25 faces the front changeover chamber 76 of the rotary damper 68, has a communication port 78 formed therethrough. When the rotary damper 68 is turned into a front position thereof, the supply duct 66 enters into communication with the wide flow duct 44 through the changeover chambers 76, 77 and the communication port 78, while having interrupted by the damper 68 its communication with the hopout outlet 18 through the air control duct 38. On the other hand, when the damper 68 is moved to take a rear position thereof, the supply duct 66 becomes complete in the communication thereof with the air control duct 38 through the changeover chambers 76, 77 and has interrupted by the damper 68 the communication with the wide flow duct 44.

Incidentally, the link mechanism 75 comprises a gear 79 fixed on the distal end of the support shaft 79 exposed outside of the left side wall portion 69, an intermediate link 82 having in the lower part thereof a toothed portion 80 meshed with the gear 79 and in the upper part thereof an elongate hole 83 formed therein, the intermediate link 82 being rotatably fitted in the central part thereof on a support shaft 81, and an interlocking link 85 engaged at the front end thereof by means of a pin 84 with the elongate hole 83 and secured at the rear end thereof to the hopout outlet 18. By means of this mechnaism 75, the rotary damper 68 is interlinked with the hopout outlet 18 such that the damper 68 takes the front position when the outlet 18 is pressed to be accommodated in the opening 14 of the face panel 2, and the rear position when the latter is released into the hopout action, whereas a spring 86 is stretched between the lower part of the intermediate link 82 and a point in the front circumferential part of the damper 68, thus resiliently biasing the damper 68 toward the rear position, thereby urging the outlet 18 counterclockwise in FIG. 1 about the shaft 60 in cooperation with the spring 61.

Further, in FIG. 3, designated at reference numeral 87 is a connector for connecting the console 11 to the air conditioner.

As detailed hitherto, by the rotary damper 68 interlinked through the link mechanism 75 with the hopout outlet 18 disposed above the air supply port 65, the wide flow duct 44 and the air control duct 38 are alternately permitted to enter into and interrupt the communication with the air supply duct 66 connected to the air conditioner. Namely, while the hopout outlet 18 is put in an accommodated position thereof as shown by solid line in FIG. 3, the wide flow duct 44 is communicating with the supply duct 66, thus blowing off controlled air, cold air for example, from the wide air distribution grille 3 into the passenger room. To the contrary, while the hopout outlet 18 is in a raised or exposed position thereof as shown by imaginary line in FIG. 3, the air control duct 38 is communicating with the supply duct 66, thus blowing off controlled air, cold air for example, from the spot outlets 12, 13 and the small air distribution grille 17 locally into the passenger room. Incidentally, the defroster duct 48 is arranged to be connectable to and disconnectable from the air supply duct 66 by suitable means or with another damper (not shown).

As will be understood from the foregoing description, in an instrument panel device for vehicles according to this embodiment, there is employed a base panel having an upper partition wall portion and a lower partition wall portion both extending substantially over the entire width of the base panel, and a triple of panel plates, i.e., a face panel, a back panel, and a top panel are fixed to the base panel to define therewith three duct spaces, thus favorably raising the rigidity of the resulted panel assembly. Moreover, the three duct spaces are effectively utilized by the provision of a defroster outlet or a pair of slits, a wide air outlet, and a plurality of local or spot air outlets including a hopout outlet.

Further, the base panel has a central face wall portion facing a passenger compartment of the vehicle and interconnecting the upper and lower partition wall portions, the face wall portion having repeated combinations of a slit formed therethrough and a fin integrally formed thereon, thus favorably refining the appearance of the panel assembly. Furthermore, the base panel is configured so as to define each duct space at no less than two sides of the duct space, thereby effectively reducing the number of panel plates to be fixed on the base panel to complete the panel assembly to a minimal number or three, i.e., needing no more than the face, back, and top panels, thus reducing the number of total component parts and the occurrence frequency of creak noises as well. Still more, the base panel is devised to have the face, back, and top panels attached thereto from due directions below, between, and under the upper and lower partition wall portions, respectively, thus permitting an easy and efficient fabrication, while achieving a well refined appearance.

Incidentally, in a state where the hopout outlet 18 is in the exposed position, when the air conditioner is operated to supply cold air, for example, through the air supply duct 66, the cold air is to be conducted from the air supply port 65 through the changeover chambers 76, 77 to the air control duct 38 and locally blown out into the passenger compartment from the small air distribution grille 17 of the hopout outlet 18 and the left and right spot air outlets 12, 13. Hence, it is permitted to locally cool the passenger compartment according to the intention of the passenger, such as when the room temperature feels relatively high in the summer season.

Moreover, when the hopout outlet 18 is pressed into the accommodated position, thereby changing over the position of the rotary damper 68, the cold air is to be conducted from the air supply port 65 through the changeover chambers 76, 77 to the wide flow duct 44 and blown out from the wide air distribution grille 3, thus wholly cooling the passenger compartment, thereby holding the temperature distribution in the passenger compartment in a proper and uniform state without undue local cold points.

Further, for the passenger compartment, the local and whole area air conditioning can be quickly selectable with ease by one-touch operations of the pushbutton 19 to be pushed down and the hopout outlets 18 to be pressed down, respectively, without the need of additional provision of a manual lever for the selection, thus permitting a compact design to be employed for the console 11, in addition to that the flat upper wall portion 56 becomes substantially flush with the face panel 2 when the hopout outlet 18 is accommodated, thus achieving an excellency in the refinement of appearance.

Furthermore, the hopout outlet 18 is adapted so as to take a pair of easily identifiable positions, i.e., the exposed position for the local air conditioning and the accommodated position for the whole area air conditioning, thus permitting any passenger to know at a glance which way of air conditioning is selected.

Still more, the hopout outlet 18 is resiliently biassed by both of the springs 61, 86 separately acting thereon, thus favorably dividing the necessary resilient force for actuation, eliminating fear such as of the partial deformation which otherwise may take place at a force-concentrated portion, with the result that a favorable durability is obtainable, while ensuring a smooth accommodation as well as a quick hopout action.

Yet more, the hopout outlet 18 and the pushbutton 19 are both prefabricatable in the frame member 15, thereby facilitating the fabrication process.

Besides above, the selection of air distribution between the air control duct 38 and the wide flow duct 44 is effected by the rotary damper 68 which, different from a customary flat-plate deflecter or damper, is low of the air resistance. Namely, in a state where, for example, cold air is supplied from the air supply port 65 through the changeover chambers 76, 77 to the wide flow duct 44, when turning the damper 68 to the rear position, the cold air through once hitting upon the peripheral wall portion 71 then flows along the peripheral wall portion 71, thus possibly minimizing the air resistance against the changeover operation while blowing out, so that the changeover operation of the rotary damper 68 as well as the accommodating and exposing operations of the hopout outlet 18 becomes smooth.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrective. The scope of the invention is indicated by the appended claims rather than by the foregoing description.

I claim:

1. An instrument panel device for a vehicle having a passenger compartment, a front wind shield fitted at the front end of said passenger compartment, a passenger's set placed in said passenger compartment, and an air conditioner for conditioning the air of said passenger compartment, comprising a base panel member having high rigidity, said base panel member being dimensioned to have substantially the same width as said passenger compartment, panel plate means attatched to said base panel member for defining therewith a defroster duct space, a wide flow duct space, and an air control duct space all adapted for the distribution of controlled air from said air conditioner, said defroster, wide flow, and air control duct spaces communicating with said passenger compartment through a defroster outlet directed toward said front windshield, a wide air outlet extending substantially over the entire width of said base panel member, and a plurality of spot air outlets directed toward said passenger's seat, respectively, said wide air outlet being formed in said base panel member, changeover means for alternatively selecting the distribution of said controlled air between said wide flow duct space and said air control duct space, a first partition wall separating said defroster duct space and said wide flow duct space from each other, a second partition wall separating said wide flow duct space and said air control duct space from each other, and said first and second partition walls forming integral parts of said base panel member; said changeover means comprising a communication part formed in said second partition wall for intercommunication between said wide flow duct space and said air control duct space, and damper means for closing and opening said communication part; said panel plate means having a hopout member fitted therein and arranged accommodatable in and exposable out of said air control space, one of said spot air outlets being formed in said hopout member, said damper means being interlocked with said hopout through a link mechanism such that said damper means opens said communication port formed in said second partition wall when said hopout member is accomodated in said air control duct space and closes said communication port when said hopout member is exposed out of said air control duct space.

2. An instrument panel device according to claim 1, wherein said damper means comprises a rotary damper member having a pair of fan-like side portions and an arcuate peripheral portion stretched between the respective circumferential edges of said side portions.

* * * * *